United States Patent

Noga

[11] Patent Number: 5,987,693
[45] Date of Patent: Nov. 23, 1999

[54] GRILL CLEANING DEVICE

[75] Inventor: Robert A. Noga, San Diego, Calif.

[73] Assignee: Noga Design, San Diego, Calif.

[21] Appl. No.: 09/115,154

[22] Filed: Jul. 14, 1998

[51] Int. Cl.[6] .................................................. A47L 13/08
[52] U.S. Cl. .................................. 15/236.08; 15/236.07; 15/236.09
[58] Field of Search ........................ 15/236.01, 236.05, 15/236.06, 236.07, 236.08, 236.09; 30/169, 172; D32/46, 49

[56] References Cited

U.S. PATENT DOCUMENTS

| 2,824,323 | 2/1958 | Tos et al. | 15/236.05 |
| 4,112,537 | 9/1978 | Heuck | 15/236.05 |
| 4,759,092 | 7/1988 | Duddy | 15/236.08 |
| 5,720,071 | 2/1998 | Hall | 15/236.08 |

FOREIGN PATENT DOCUMENTS 672081  10/1989  Switzerland .................... 15/236.07

Primary Examiner—Terrence R. Till
Attorney, Agent, or Firm—William Patrick Waters

[57] ABSTRACT

A device for cleaning cooking grill rails which includes an elongated blade for scraping movement along the rails, and a handle having an elongated portion connected to the blade. The blade is attached to the elongated handle portion for rotation thereabout in a plane substantially perpendicular to the elongated portion axis. The elongated blade includes a plurality of flat fingers, disposed substantially perpendicularly to the axis of the blade. The fingers are suitable for insertion between grill rails for scraping purposes. Rotation of the elongated blade about the elongated handle portion imparts a capability for using the fingers with a variety of grills where the distance between rails differs.

9 Claims, 1 Drawing Sheet

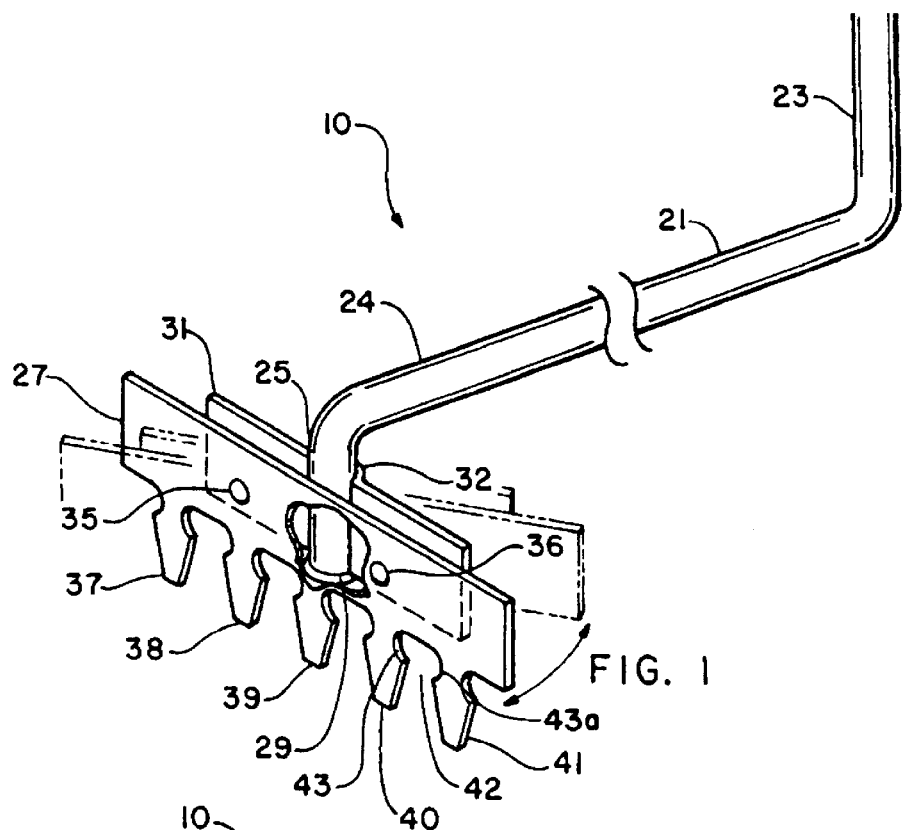
FIG. 1
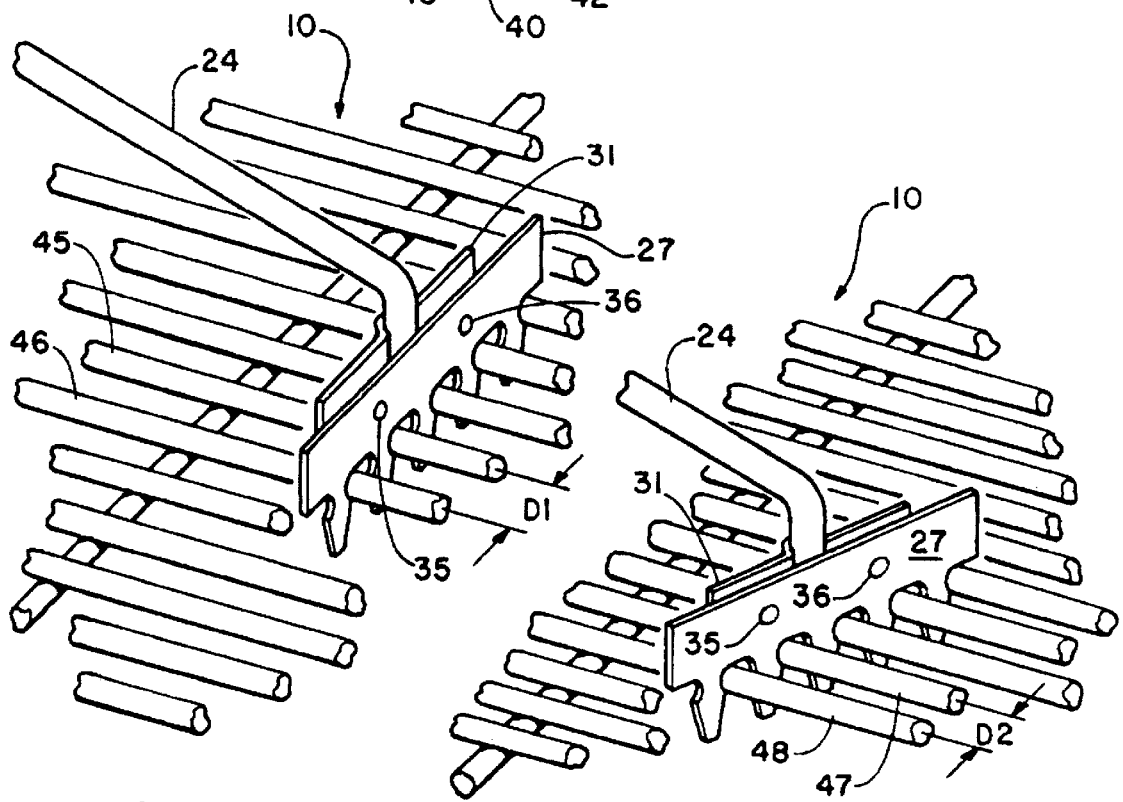
FIG. 2
FIG. 3

GRILL CLEANING DEVICE

FIELD OF THE INVENTION

The present invention relates generally to grill cleaning devices and, more particularly, to devices for cleaning grill rails by scraping.

BACKGROUND ART

The outdoor barbecue grill is very popular in these times and varieties of meals are prepared on them. Generally, gas or burning charcoal are used to heat the barbecue grill to cooking temperatures.

Frequently, after the food has been cooked, a charred and sometimes greasy residue remains on the grill rails. In most cases, it is desirable to remove the residue from the grill rails before cooking another meal.

In general, conventional grill rails have curved top surfaces and flat side surfaces. As a result of use, grease accumulates on the rail surfaces and it is often difficult to clean their top and side surfaces. Spatulas and wire brushes have some limited utility in such cleaning. However, the spatula is generally limited to scraping residue on flat surfaces and wire brushes broadcast material during the cleaning process, thereby limiting their utility.

Further, there is often little uniformity among various brands of barbecues. Thus, it is not uncommon to find the distances between grill rails in one model to be quite different from that in others. As a result, a grill scraping device that is suitable for one grill may have little or no value for cleaning another.

In view of the foregoing, it would be desirable to have a grill scraping device that would have the capability of cleaning the top and side surfaces of grill rails and which would be suitable for use with a variety of grills.

DISCLOSURE OF INVENTION

It is an object of the present invention to provide a grill scraping device that is suitable for use with a variety of grills.

Briefly, the object of the present invention is realized by providing a device for cleaning cooking grill rails which includes an elongated blade for scraping movement along the rails, and a handle having an elongated portion connected to the blade. The blade is attached to the elongated handle portion for rotation thereabout in a plane substantially perpendicular to the elongated portion axis. The elongated blade includes a plurality of flat fingers, disposed substantially perpendicularly to the axis of the blade. The fingers are suitable for insertion between grill rails for scraping purposes. Rotation of the elongated blade about the elongated handle portion imparts a capability for using the fingers with a variety of grills where the distance between rails differs.

A principal advantage of the present invention is the fact that a single grill scraping device is suitable for use with a variety of grills, even when distances between rails differ from one grill to another. Another advantage is that the present invention is comprised of few parts and is constructed of readily available and inexpensive materials.

BRIEF DESCRIPTION OF DRAWINGS

The above mentioned and other objects and features of this invention and the manner of attaining them will become apparent and the invention itself will be best understood by reference to the following description of the embodiment of the invention in conjunction with the accompanying drawings, wherein:

FIG. 1 is an isometric view of a grill scraping device according to the present invention;

FIG. 2 is a pictorial view of rails of a grill, showing the grill scraping invention of FIG. 1 engaging some of the rails; and FIG. 3 is a pictorial view of rails of a another grill, showing the grill scraping invention of FIG. 1 engaging some of the rails.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

BEST MODE FOR CARRYING OUT THE INVENTION

Referring to FIG. 1, there is shown a grill scraping device 10 of the present invention. The device 10 includes a handle 21 having an upper portion 23 to facilitate grasping by a user for operation of the device at a distance away from the grill rails to be scraped. Angling downwardly from the upper portion 23 is a body portion 24, shown in FIG. 1 as of indeterminate length. Attached to the body portion 24, at about a right angle, is a terminal portion 25.

An elongated scraper blade 27 is rotatably attached to the terminal portion 25. Fixed to the scraper plate 27, by conventional fasteners, such as rivets 35 and 36, is a backing plate 31. A collar portion 32 on the plate 31 is disposed about the terminal portion 25 to aid in holding together the scraper plate 27 and the terminal portion 25. In this regard, a bead 29, formed at the end of the terminal portion 25 and disposed below the backing plate 31, functions also to hold the scraper plate 27 against the terminal portion 25, for rotational movement thereabout.

As shown in phantom in FIG. 1, the scraper plate 27 is capable of rotation about the terminal portion 25, in a plane perpendicular to the axis of the terminal portion 25.

The elongated scraper plate 27 includes a plurality of grill scraping members, such as the spatulate fingers 37–41, which extend in a direction substantially perpendicular to the scraper plate axis. As will be noted with reference to FIG. 1, the capability of rotating the scraper plate 27 enables use of the present invention for scraping rails, such as rails 45 and 46, which are relatively widely spaced (see D1 of FIG. 2) or closely spaced, such as rails 47 and 48 (see D2 of FIG. 3). As an aid in conforming the angle of rotation of the scraper blade 27 to the rails to be scraped, each of the spatulate fingers 37–41 is tapered toward its end for easy insertion of the fingers between the grill rails.

Referring to the spatulate finger 40 as exemplary of the others, it will be noted that the finger 40 has an arcuate cut out portion 43 which, in combination with the scraper plate 27 and a similar arcuate cut out portion 43a on the finger 41, defines an opening 42 which is suited to simultaneous scraping of rail top and side surfaces.

Referring now to FIGS. 2 and 3, the grill scraping device 10 is shown engaging grill rails for cleaning purposes. In each case, the rails, such as rails 46 and 46 (FIG. 2) and rails 46 and 47 (FIG. 3) are parallel and are separated one from the other by a distance. In the case of the rails of FIG. 2, the rails are separated by a distance D1 while the rails of FIG. 3 are separated by a shorter distance D2.

It will be evident that there are additional embodiments and applications which are not disclosed in the detailed description but which clearly fall within the scope and spirit of the present invention. The specification is, therefore, intended not to be limiting, and the scope of the invention is to be limited only by the following claims.

What is claimed is:

1. A device for cleaning rails of cooking grills, wherein said rails have a top surface and side surfaces, the device comprising:

a elongated blade for scraping movement along the top surfaces and side surfaces of said cooking grill rails, said blade including means for scraping said rail top and side surfaces;

a handle, said handle having an elongated portion connected to said blade; and means for fixing said blade to said elongated portion for rotational movement of said blade in a plane substantially perpendicular to the axis of said elongated portion.

2. The device according to claim 1 wherein said elongated blade includes a plurality of rail scraping members, each one of said members extending from said elongated blade in a direction substantially perpendicular to the long axis thereof.

3. The device according to claim 2 wherein each one of said members includes a plurality of arcuate notches for frictional engagement of said cooking grill rails.

4. The device according to claim 1 wherein said elongated blade includes a plurality of spatulate fingers, each one of said spatulate fingers extending from said elongated blade in a direction substantially perpendicular to the long axis thereof.

5. The device according to claim 4 wherein each one of said spatulate fingers includes a plurality of arcuate notches for frictional engagement of said cooking grill rails.

6. The device according to claim 4 wherein each one of said spatulate fingers includes a truncated tapered end.

7. The device according to claim 1 wherein said means for fixing includes a plate fixed to said elongated blade and holding said elongated handle portion between said plate and said blade for relative rotational movement between said elongated blade and said elongated handle portion.

8. The device according to claim 7 wherein said plate includes collar means for holding said elongated handle portion for rotational movement.

9. The device according to claim 1 wherein said means for fixing includes a bead on said elongated handle portion.

* * * * *